(12) United States Patent
Hayashi et al.

(10) Patent No.: US 8,570,641 B2
(45) Date of Patent: Oct. 29, 2013

(54) DISPLAY SHEET, DISPLAY DEVICE, AND ELECTRONIC APPARATUS

(75) Inventors: Kenji Hayashi, Shiojiri (JP); Tadashi Yamada, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 13/238,375

(22) Filed: Sep. 21, 2011

(65) Prior Publication Data

US 2012/0105940 A1    May 3, 2012

(30) Foreign Application Priority Data

Oct. 28, 2010 (JP) ................................ 2010-242241

(51) Int. Cl.
*G02B 26/00* (2006.01)
(52) U.S. Cl.
USPC .......................................... 359/296; 359/290
(58) Field of Classification Search
USPC ................................................ 359/290–296
See application file for complete search history.

(56) References Cited

U.S. PATENT DOCUMENTS

| 6,113,810 | A | 9/2000 | Hou et al. |
| 7,656,576 | B2 | 2/2010 | Suwabe et al. |
| 2008/0112040 | A1 | 5/2008 | Suwabe et al. |
| 2010/0061195 | A1* | 3/2010 | Kanbayashi .................. 368/239 |
| 2010/0134873 | A1* | 6/2010 | van Lieshout et al. ........ 359/296 |

FOREIGN PATENT DOCUMENTS

| JP | A-08-510790 | 11/1996 |
| JP | A-2007-065288 | 3/2007 |
| JP | A-2007-171605 | 7/2007 |
| JP | B1-4049202 | 2/2008 |
| JP | A-2008-139803 | 6/2008 |
| JP | A-2008-216321 | 9/2008 |
| WO | WO 94/28202 A1 | 12/1994 |

* cited by examiner

*Primary Examiner* — Mahidere Sahle
(74) *Attorney, Agent, or Firm* — Oliff & Berridge, PLC

(57) ABSTRACT

A display device includes a substrate that is provided on a display surface side, an opposing substrate that is arranged opposing the substrate, and a display layer that is provided between the substrate and the opposing substrate. The display layer includes a three-dimensional elastic body that is impregnated by a dispersion liquid in which at least one type of particle that is positively or negatively charged is dispersed in a dispersion medium and a bonding layer that is provided between the three-dimensional mesh-like elastic body and the substrate and which bonds the three-dimensional mesh-like elastic body to the substrate.

10 Claims, 14 Drawing Sheets

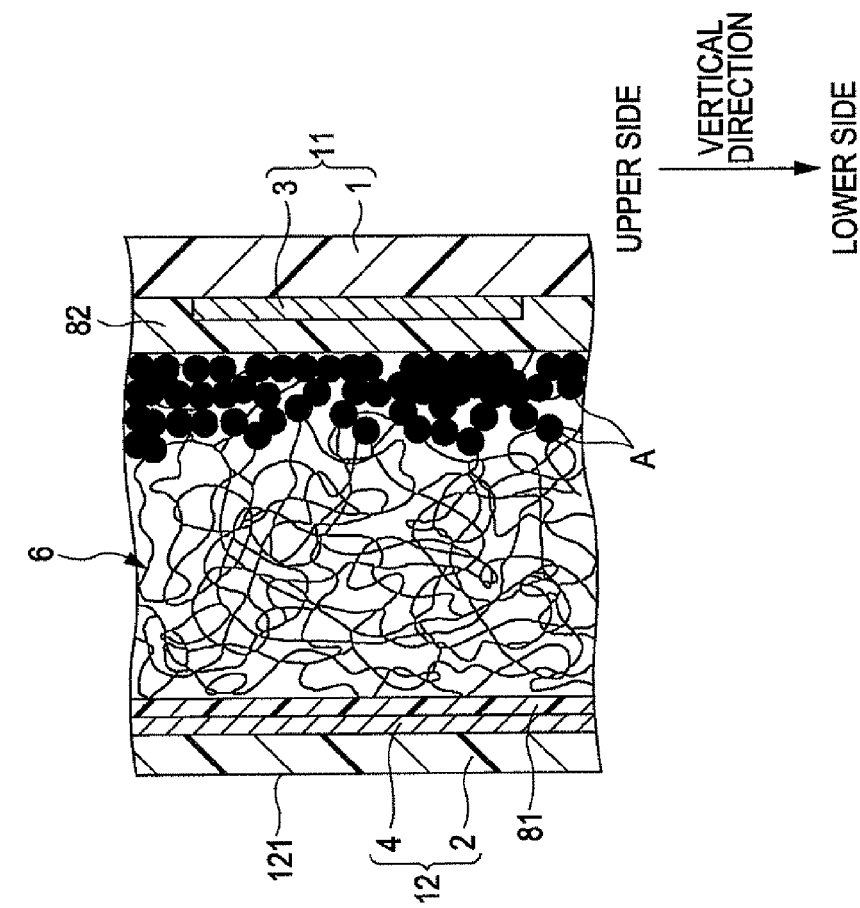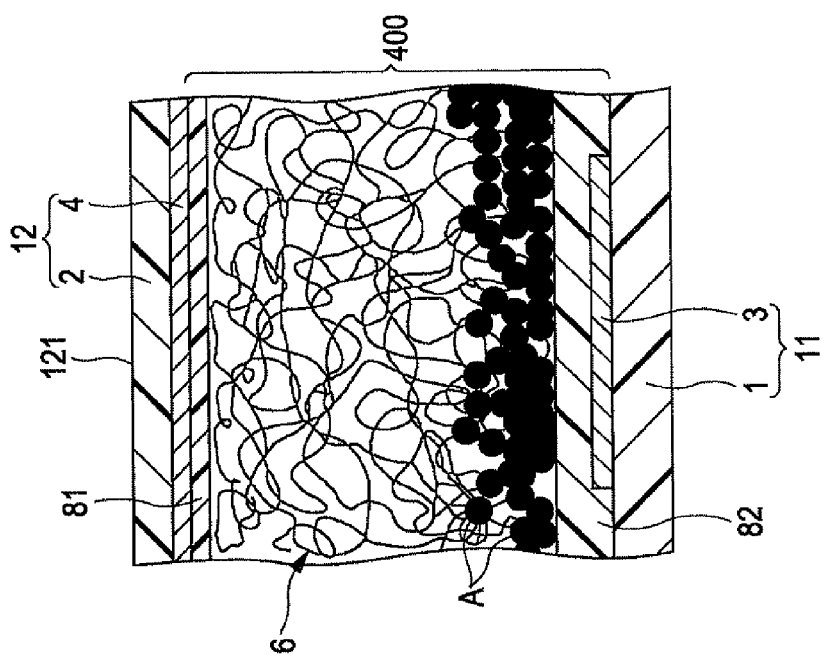

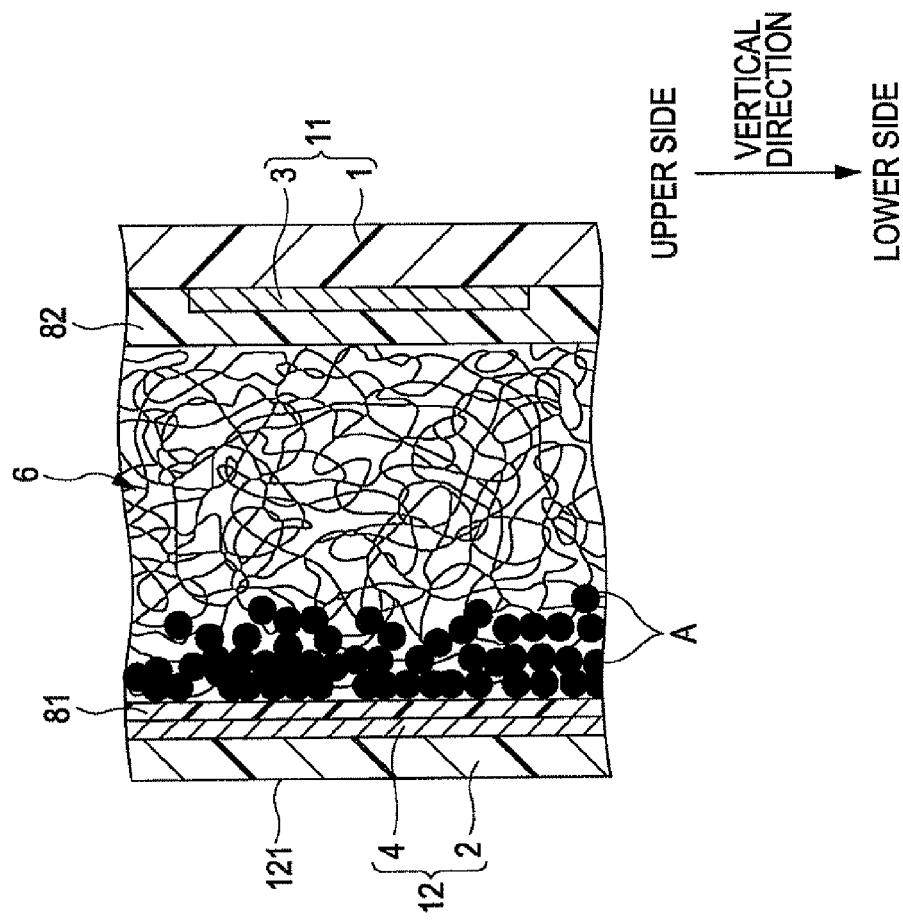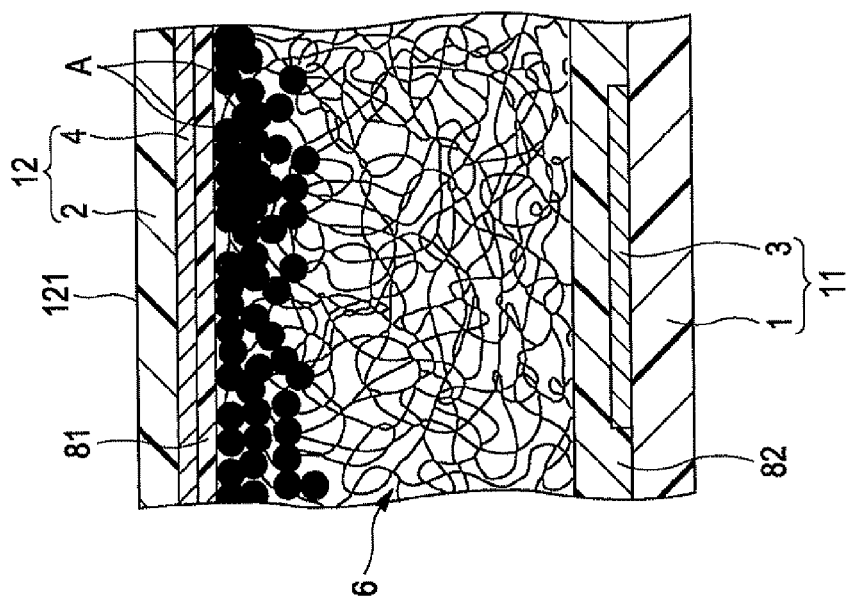

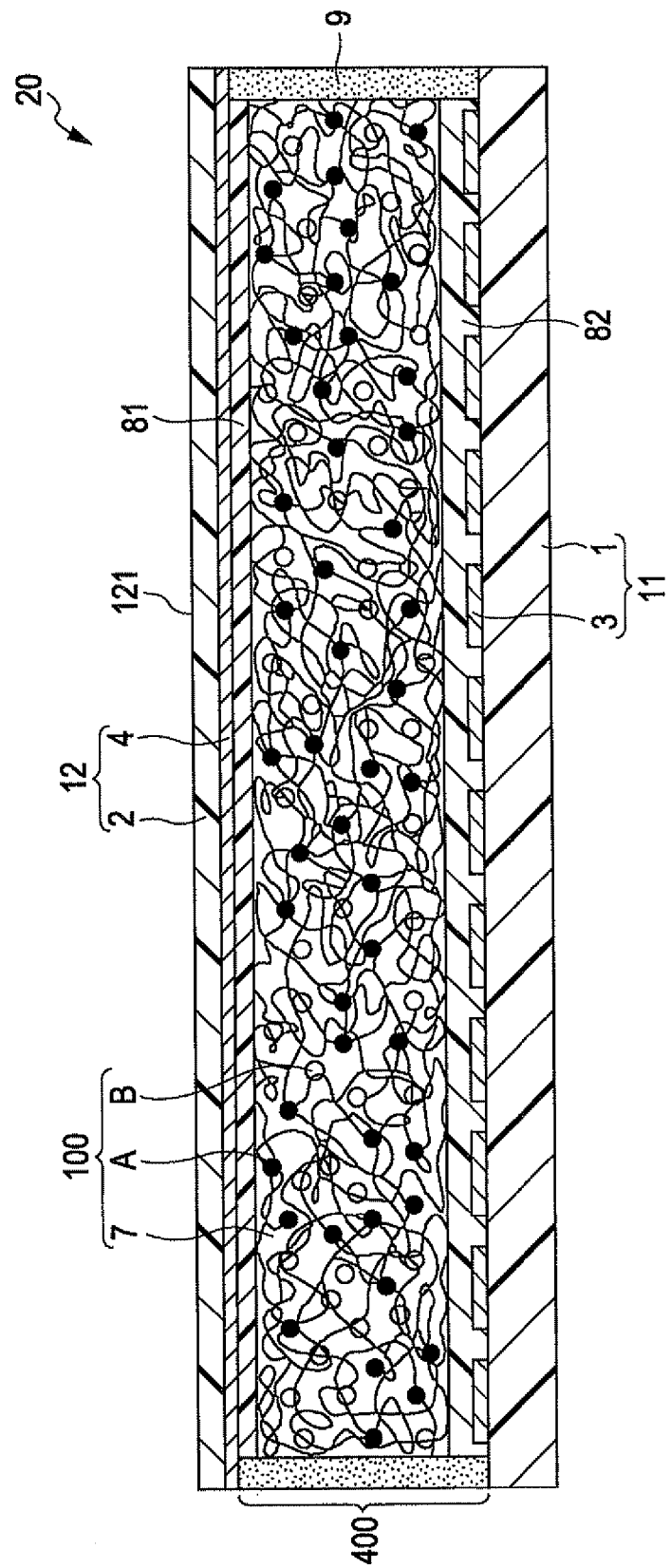

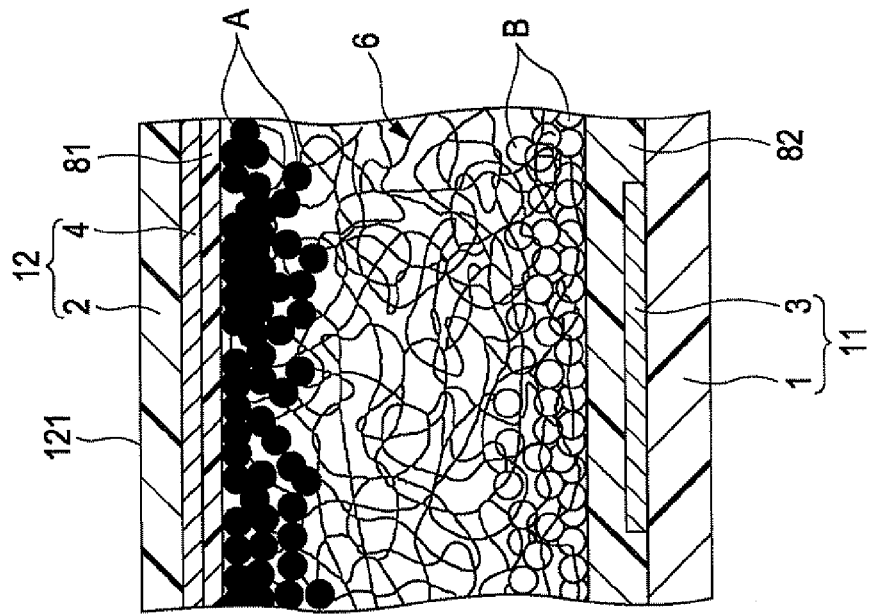
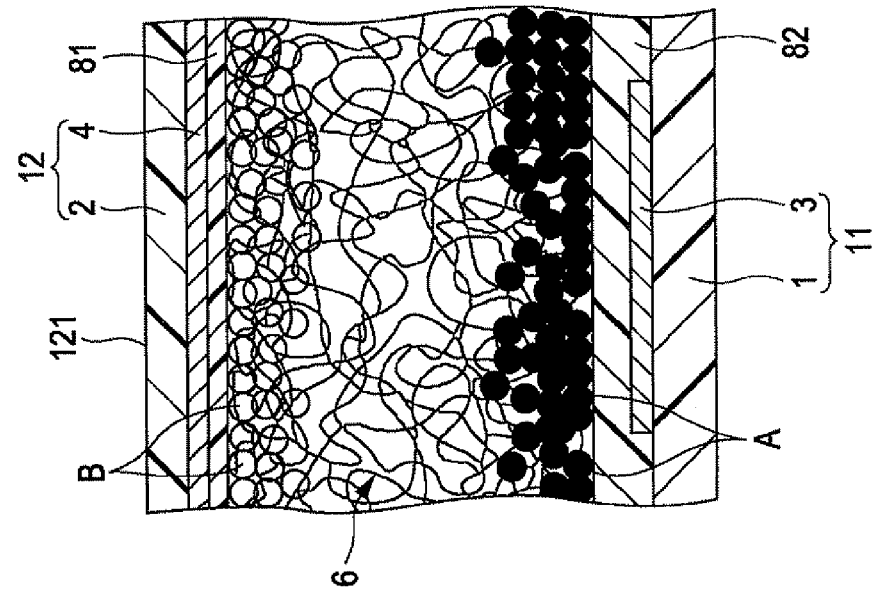

DISPLAY SHEET, DISPLAY DEVICE, AND ELECTRONIC APPARATUS

BACKGROUND

1. Technical Field

The present invention relates to a display sheet, a display device, and an electronic apparatus.

2. Related Art

As an example of a configuration of an image display unit of electronic paper, an electrophoretic display that uses electrophoresis of particles is known (for example, refer to JP-T-8-510790). An electrophoretic display has excellent portability and energy efficiency, and is particularly suited as the image display unit of electronic paper.

An electrophoretic display includes a pair of electrodes, each of which is arranged opposing the other, and a display layer that is provided therebetween, and for example, a dispersion liquid that is composed by dispersing white particles that are positively charged and black particles that are negatively charged in a liquid phase dispersion medium fills the display layer. Such an electrophoretic display is configured to display a predetermined image by applying a voltage between each of the pair of electrodes and causing the white particles and the black particles to migrate in predetermined directions.

Here, in the related art, as a configuration of the display layer, a "liquid crystal type" of filling the display layer as a single space (that is, without dividing by a partition wall or the like) with a dispersion liquid as in JP-T-8-510790 is known.

With a display device with such a "liquid crystal type" display layer, although almost the entirety of the display surface is able to be used as an effective display region (region in which display colors are able to be displayed (switched)), there is a problem that, for example, in a case when the display is placed upright like a book, the white particles and the black particles move (sink) to the lower side in the perpendicular direction due to their own weight, the display image is not able to be maintained, and reliability is lowered. Furthermore, since a member that also functions as a reinforcing member such as a partition wall is not provided in a display layer 400, there is a problem that the strength of the display device is low.

SUMMARY

An advantage of some aspects of the invention is that a display sheet with high mechanical strength and reliability and which is able to exhibit excellent display characteristics, a display device including such a display sheet, and an electronic apparatus with high reliability are able to be provided.

Such an advantage is achieved by aspects of the invention described below.

A display sheet according to an aspect of the invention includes: a first substrate; a second substrate that is arranged opposing the first substrate; and a display layer that is provided between the first substrate and the second substrate, wherein the display layer includes a three-dimensional elastic body that is impregnated by a dispersion liquid in which at least one type of particle that is positively or negatively charged is dispersed in a dispersion medium and a first substrate side bonding layer that is provided between the three-dimensional mesh-like elastic body and the first substrate and which bonds the three-dimensional mesh-like elastic body to the first substrate.

In so doing, it is possible to provide a display sheet with high mechanical strength and reliability with excellent display characteristics.

In a display sheet according to an aspect of the invention, it is preferable that the display layer further includes a second substrate side bonding layer that is provided between the three-dimensional mesh-like elastic body and the second substrate and which bonds the three-dimensional mesh-like elastic body to the second substrate.

In so doing, the mechanical strength of the display device increases further.

In a display sheet according to an aspect of the invention, it is preferable that both the first substrate and the second substrate are flexible.

In so doing, the display device becomes a user-friendly display device.

In a display sheet according to an aspect of the invention, it is preferable that the three-dimensional mesh-like elastic body is configured by an amphiphilic polymer including both a lipophilic group and a hydrophilic group.

In so doing, while affinity with the dispersion medium of the three-dimensional mesh-like elastic body increases, dissolution into the dispersion medium is able to be prevented.

In a display sheet according to an aspect of the invention, it is preferable that the three-dimensional mesh-like elastic body is configured by a thermoplastic polymer.

In so doing, a three-dimensional mesh-like elastic body with greater porosity is able to be obtained.

In a display sheet according to an aspect of the invention, it is preferable that in the three-dimensional mesh-like elastic body, the first substrate side have a greater porosity than the second substrate side.

In so doing, the display characteristics of the display device improves.

In a display sheet according an aspect of the invention, it is preferable that the three-dimensional mesh-like elastic body exhibit a different color from that of the particles.

In so doing, since it is possible to display two or more display colors without using a plurality of particles with different colors, the configuration of the display device becomes simple.

In a display sheet according to an aspect of the invention, it is preferable that both the first substrate side bonding layer and the second substrate side bonding layer be configured by a thermoplastic resin with a lower softening temperature than the three-dimensional mesh-like elastic body.

In so doing, it is possible to bond the three-dimensional mesh-like elastic body to the first substrate side bonding layer and the second substrate side bonding layer firmly while preventing the loss of vacancies in the three-dimensional mesh-like elastic body.

In a display sheet according to an aspect of the invention, it is preferable that both the first substrate side bonding layer and the second substrate side bonding layer have a lower porosity than the three-dimensional mesh-like elastic body.

In so doing, it is possible to more firmly bond the three-dimensional mesh-like elastic body to the first substrate side bonding layer and the second substrate side bonding layer. Furthermore, it is possible to prevent particles from infiltrating the inside of the first substrate side bonding layer or the second substrate side bonding layer effectively.

A display device according to an aspect of the invention includes a display sheet according to an aspect of the invention.

In so doing, it is possible to provide a highly reliable display device.

An electronic apparatus according to an aspect of the invention includes a display device according to an aspect of the invention.

In so doing, it is possible to provide a highly reliable electronic apparatus.

BRIEF DESCRIPTION OF THE DRAWINGS

The invention will be described with reference to the accompanying drawings, wherein like numbers reference like elements.

FIGS. 4A and 4B are cross-sectional diagrams that describe the driving and the effect of the display device that is illustrated in FIG. 1.

FIGS. 5A and 5B are another cross-sectional diagrams that describe the driving and the effect of the display device that is illustrated in FIG. 1.

FIG. 8 is a cross-sectional diagram that illustrates a Second Embodiment of a display device according to an aspect of the invention.

FIGS. 9A and 9B are cross-sectional diagrams for describing the driving of the display device that is illustrated in FIG. 8.

DESCRIPTION OF EXEMPLARY EMBODIMENTS

Below, a display sheet, a display device, and an electronic apparatus according to some aspects of the invention will be described in detail based on the preferential embodiments that are illustrated in the attached drawings.
Display Device First, a display device in which a display sheet according to an aspect of the invention is included will be described.

First Embodiment

Figure 1:
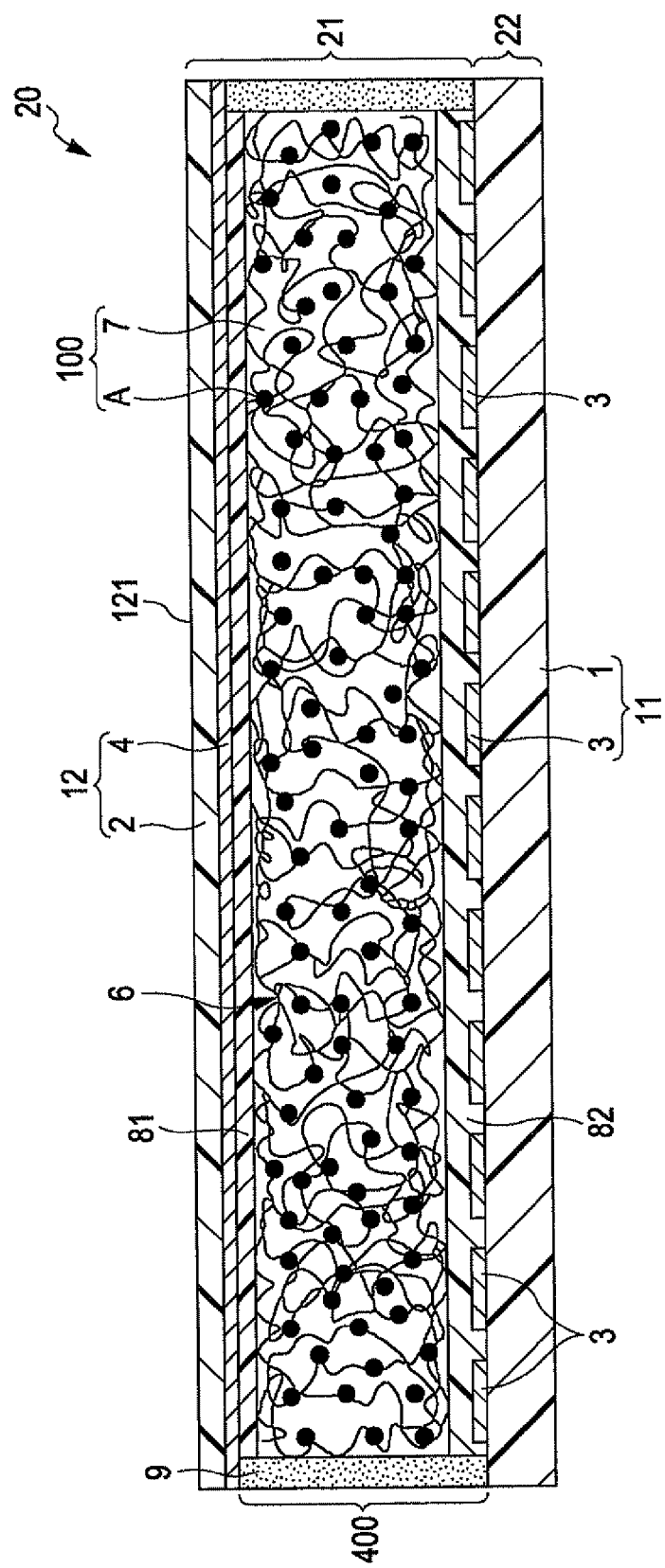
FIG. 1 is a cross-sectional diagram that illustrates a First Embodiment of a display device according to an aspect of the invention.
Figure 2:
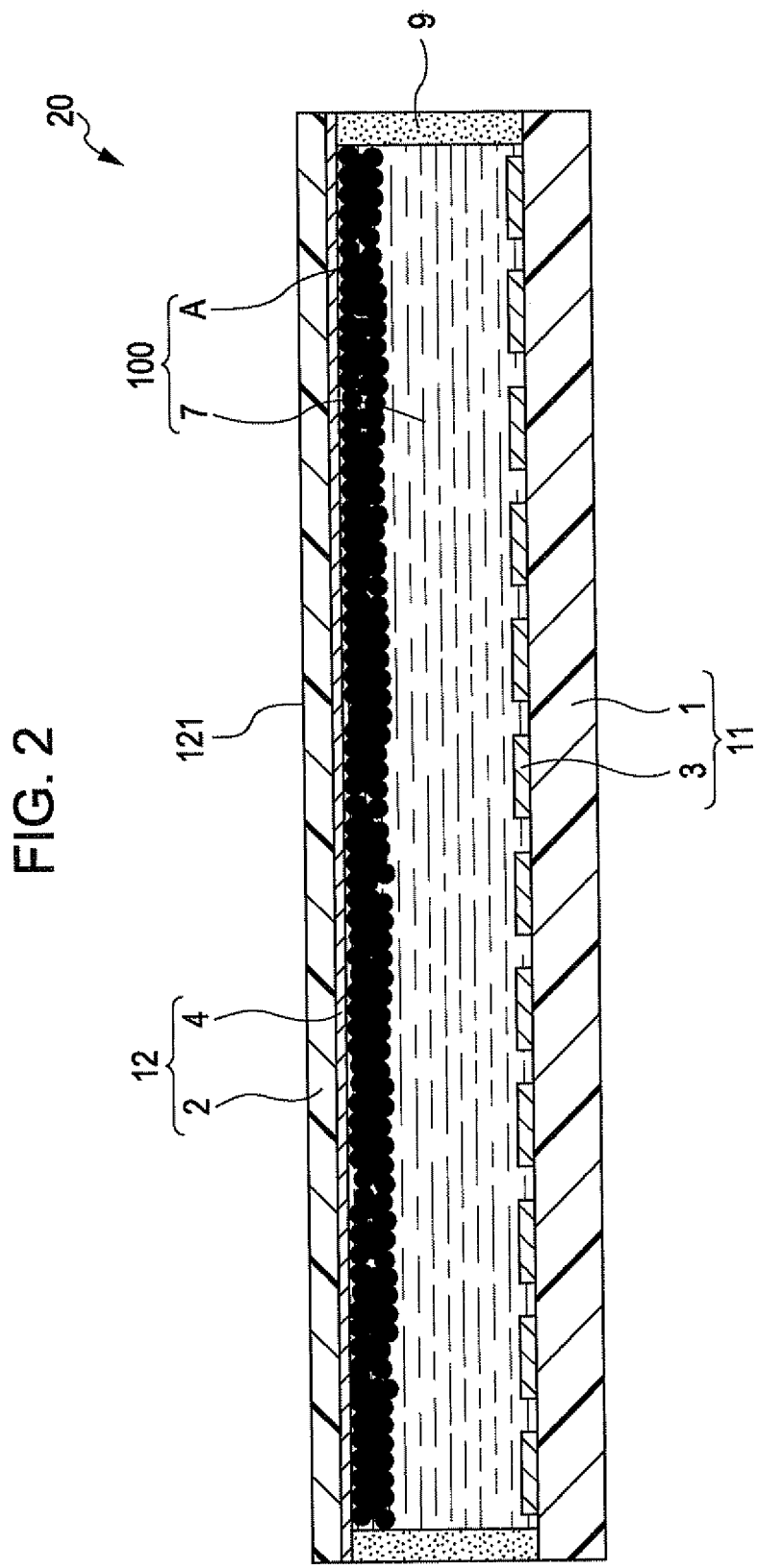
FIG. 2 is a diagram that illustrates a problem with a display device of the related art.
Figure 3:
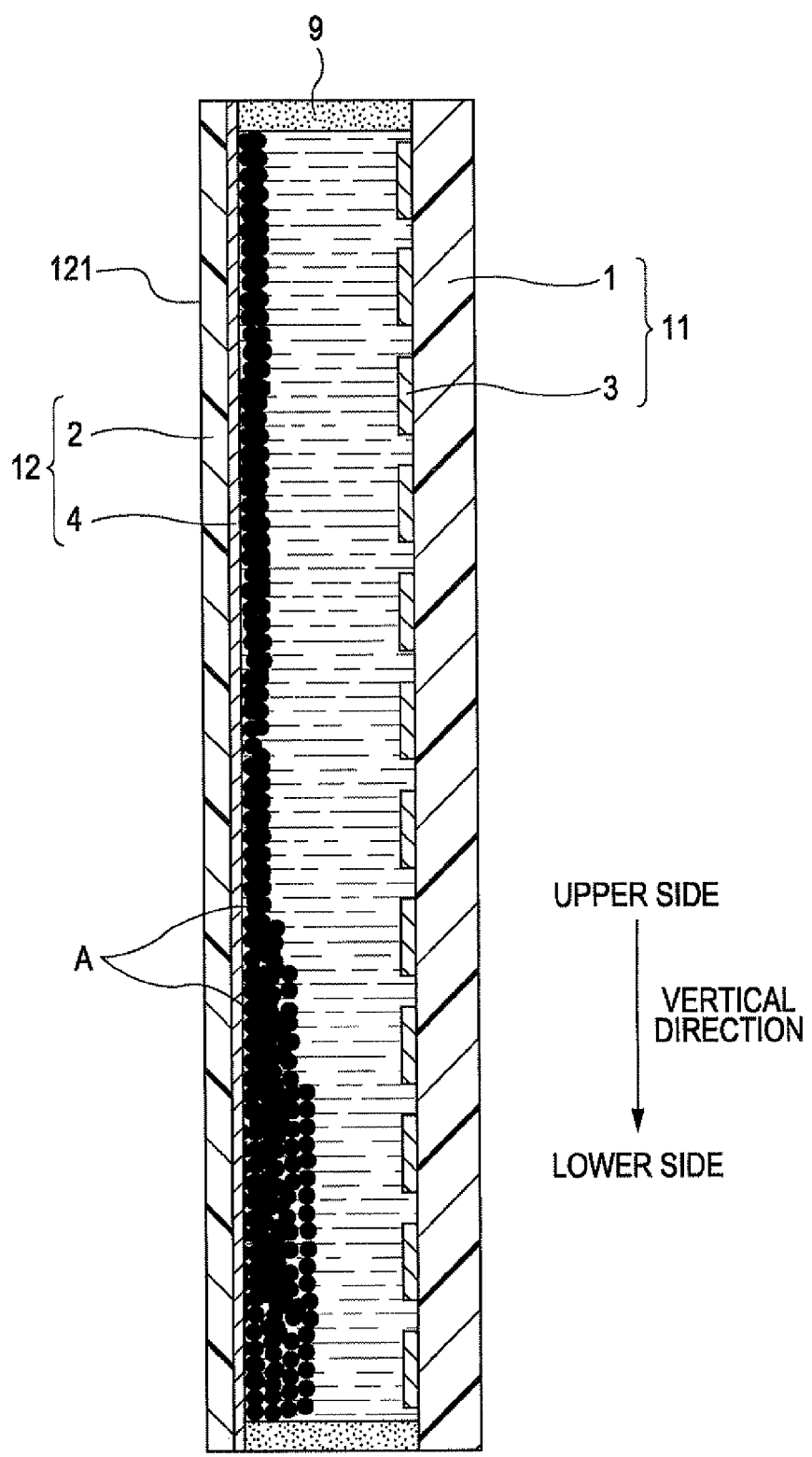
FIG. 3 is another diagram that illustrates a problem with a display device of the related art.

FIG. 1 is a cross-sectional diagram that illustrates a First Embodiment of a display device according to an aspect of the invention, FIGS. 2 and 3 are diagrams that illustrate problems with a display device of the related art, FIGS. 4A and 4B and 5A and 5B are respectively cross-sectional diagrams that describe the driving and the effect of the display device that is illustrated in FIG. 1, and FIGS. 6A to 6D and FIGS. 7A to 7D are respectively cross-sectional diagrams for describing the manufacturing method of the display device that is illustrated in FIG. 1. Here, below, for convenience of description, description will be performed with the upper sides of FIGS. 1 to 7D referred to as "the top" and the lower sides as "the bottom".

A display device (a display device according to an aspect of the invention) 20 that is illustrated in FIG. 1 is an electrophoretic display device that displays a desired image using the migration of particles. The display device 20 includes a display sheet (front plane) 21 and a circuit substrate (backplane) 22.

As illustrated in FIG. 1, the display sheet 21 includes a substrate (first substrate) 12 that includes a flat base 2 and a second electrode 4 that is provided on a lower surface of the base 2, and a display layer 400 that is provided over the substrate 12 and which is filled with a dispersion liquid 100. In such a display sheet 21, an upper surface of the substrate 12 configures a display surface 121. Here, hereinafter, the display surface 121 refers to a region that overlaps the display layer 400 on an upper surface of the substrate 12 in plan view of the display device 20, and all other regions (for example, a region that overlaps a sealing portion 9 described later) are excluded.

On the other hand, the circuit substrate 22 includes an opposing substrate 11 that includes a flat base 1 and a plurality of first electrodes 3 that are provided on an upper surface of the base 1, and a circuit (not shown) that is provided on the opposing substrate 11. The circuit includes, for example, TFTs (switching elements) that are arranged in a matrix form, a gate line and a data line that are formed to correspond with the TFTs, a gate driver that applies a predetermined voltage to the gate line, a data driver that applies a predetermined voltage to the data line, and a control unit that controls the driving of the gate driver and the data driver.

In such a display device 20, the opposing substrate 11 also serves as a second substrate of the display sheet 21.

Below, the configurations of each of the portions will be sequentially described.

The base 1 and the base 2 are respectively configured by sheet-shaped (flat) members, and include a function of supporting and protecting each of the members that are arranged therebetween. Although each of the bases 1 and 2 may respectively be either flexible or stiff, it is preferable that the bases be flexible. By using flexible bases 1 and 2, it is possible to obtain a flexible display device 20, that is, a display device 20 that is useful in structuring electronic paper, for example.

In a case when each of the bases (base material layers) 1 and 2 are flexible, for example, polyesters such as PET (polyethylene terephthalate) and PEN (polyethylene naphthalate), polyolefins such as polyethylene or polypropylene and COP (cyclic polyolefin), acrylic resins such as polycarbonate, polyamide, thermoplastic polyamide, polyester, polyether ether ketone, polyurethane, and polymethylmethacrylate, various types of thermoplastic elastomers such as chlorinated polyethylenes, and a copolymer, blend, polymer alloy, or the like based on the above are exemplified as the configuration materials of the bases 1 and 2, and one or two or more types thereof are able to be used by mixing.

Although the average thicknesses of such bases 1 and 2 are respectively set appropriately by the configuration material, usage, or the like and are not particularly limited, in a case when the bases are flexible, it is preferable that the thicknesses be equal to or greater than 20 µm and equal to or less than 500 µm, and further preferably equal to or greater than 50 µm and equal to or less than 200 µm. In so doing, it is possible to miniaturize (in particular, causing to become thinner) the display device 20 while maintaining the balance between the pliability and the strength of the display device 20.

Film-shaped first electrodes 3 and a second electrode 4 are respectively provided on surfaces of such bases 1 and 2 on the display layer 400 side, that is, on the upper surface of the base 1 and the lower surface of the base 2. In the embodiment, the second electrode 4 is a shared electrode, and the first electrodes 3 are individual electrodes (pixel electrodes that are connected to TFTs) that are divided in a matrix form. In such a display device 20, a region in which one first electrode 3 and the second electrode 4 overlap configures one pixel.

The configuration materials of the electrodes 3 and 4 are not particularly limited as long as the materials are substantially conductive, and for example, various types of conductive materials such as metallic materials such as gold, silver, bronze, aluminum, or an alloy that includes the above, carbon-based materials such as carbon nanotubes, graphene, or fullerene, electron conductive polymer materials such as polythiophene, polyacetylene, polyfluorene, or a derivative thereof, ion conductive polymer materials in which an ionic substance such as NaCl or $Cu(CF_3SO_3)_2$ is dispersed in a matrix resin such as polyvinyl alcohol or polycarbonate, and conductive oxide materials such as indium oxide (IO), indium tin oxide (ITO), or fluorine-doped oxide (FTO) are exemplified, and one or two or more types thereof are able to be used in combination.

Out of the above, a carbon-based material such as carbon nanotubes, graphene, or fullerene is preferable as the configuration material of the electrodes 3 and 4. In so doing, as will be described later, since the adhesiveness of the second electrode 4 to a bonding layer 81 and the adhesiveness of the first electrodes 3 to a bonding layer 82 are able to be increased, the mechanical strength of the display device 20 is improved.

In addition, although the average thicknesses of the electrodes 3 and 4 are respectively set appropriately by the configuration material, usage, or the like and are not particularly limited, the thicknesses are preferably equal to or greater than 0.01 μm and equal to or less than 10 μm, and more preferably equal to or greater than 0.02 μm and equal to or less than 5 μm.

Here, out of each of the bases 1 and 2 and each of the electrodes 3 and 4, the base and the electrode that are arranged on the display surface 121 side are respectively light-transmissive, that is, substantially transparent (clear and colorless, clear and colored, or translucent). In the embodiment, since the surface of the substrate 12 configures the display surface 121, at least the base 2 and the second electrode 4 are substantially transparent. In so doing, it becomes possible to visually recognize easily the state of black particles A in a dispersion liquid 100, that is, information (image) displayed on the display device 20 from the display surface 121 side.

A sealing portion 9 is provided between the substrate 12 and the opposing substrate 11 along the margins thereof. The display layer 400 is sealed in an airtight manner by the sealing portion 9. In so doing, by preventing the leaking of the dispersion liquid 100 to the outside of the display device 20 or the infiltration of moisture inside the display device 20, deterioration in the display performance of the display device 20 is able to be prevented reliably.

The configuration material of the sealing portion 9 is not particularly limited, and for example, various types of resin materials such as thermoplastic resins such as acrylic resin, urethane resin, or olefin resin and thermosetting resins such as epoxy resin, melamine resin, or phenolic resin are exemplified and one or two or more types thereof are able to be used in combination.

As illustrated in FIG. 1, the display layer 400 includes a three-dimensional mesh-like elastic body 6 to which the dispersion liquid 100 is impregnated, a bonding layer (first substrate side bonding layer) 81 that bonds the substrate 12 to the three-dimensional mesh-like elastic body 6, and a bonding layer (second substrate side bonding layer) 82 that bonds the opposing substrate 11 to the three-dimensional mesh-like elastic body 6. In other words, the three-dimensional mesh-like elastic body 6 is arranged (immersed) in the display layer 400 that is filled with the dispersion liquid 100, and while the three-dimensional mesh-like elastic body 6 is bonded to the substrate 12 via the bonding layer 81, it can be said that the three-dimensional mesh-like elastic body 6 is also bonded to the opposing substrate 11 via the bonding layer 82.

The dispersion liquid 100 is the positively or negatively charged black particles (particles) A that are dispersed in a dispersion medium 7.

A material with relatively good insulation is preferably used as the dispersion medium 7. Although not limited, the boiling point of the dispersion medium 7 is preferably 150° C. or higher. As the dispersion medium 7, for example, alcohols such as methanol, cellosolves such as methyl cellosolve, esters such as methyl acetate, ketones such as acetone, aliphatic hydrocarbons (liquid paraffin) such as pentane, alicyclic hydrocarbons such as cyclohexane, aromatic hydrocarbons such as benzene, halogenated hydrocarbons such as methylene chloride, aromatic heterocycles such as pyridine, nitriles such as acetonitrile, amides such as N,N-dimethylformamide, carboxylates, silicone oil, and various other types of oils are exemplified, and the above are able to be used alone or as a mixture.

Among the above, a material with an aliphatic hydrocarbon (liquid paraffin) or silicone oil as the principal component is preferable as the dispersion medium 7. A dispersion medium 7 with liquid paraffin or silicone oil as the principal component is preferable due to the excellent transparency and heat resistance thereof, as well as the strong effect of suppressing agglomeration of the black particles A. In so doing, it is possible to more reliably prevent or suppress deterioration in the display performance of the display device 20 over time. Further, liquid paraffin or silicone oil is preferable from the point of view of excellent weatherability and high level of safety due to the lack of unsaturated bonds.

Various types of additives, for example, dispersants, lubricants, stabilizers, and the like such as a charge control agent composed of particles of electrolyte, surfactants (anionic or cationic) such as alkenyl succinic acid ester, metallic soaps, resin materials, rubber materials, oils, varnishes, compounds, or the like, a silane coupling agent, or the like may be added to the dispersion medium 7 according to need. Further, in a case when the dispersion medium 7 is to be colored, various types of dyes such as anthraquinone dyes, azo dyes, and indigoid dyes may be dissolved in the dispersion medium 7 according to need.

The black particles A are charged particles that are able to electrically migrate within the dispersion medium 7 due to an electric field acting therein. Although the black particles A are not particularly limited and any charged material is able to be used, at least one type of pigment particles, resin particles, or composite particles thereof is preferably used. Such particles have the advantage of being easy to manufacture as well as allowing control of the charge to be performed relatively easily.

As a pigment that configures pigment particles, for example, black pigments such as aniline black, carbon black, titanium black, or copper chromite, white pigments such as titanium oxide or antimony oxide, yellow pigments such as azo pigments such as monoazos, isoindolinone, or chrome yellow, red pigments such as quinacridone red or chrome vermilion, blue pigments such as phthalocyanine blue or indanthrene blue, and green pigments such as phthalocyanine green are exemplified, and one or two or more types of the above are able to be used in combination.

In addition, as a resin material that configures resin particles, for example, acrylic resin, urethane resin, urea resin, epoxy resin, polystyrene, polyester, and the like are exemplified, and one or two or more types of the above may be used in combination.

Further, as composite particles, for example, particles in which the surfaces of pigment particles are coated by a resin material or another pigment, particles in which the surfaces of resin particles are coated by pigments, particles that are configured by a mixture in which pigments and resin materials are mixed at an appropriate composition ratio, and the like are exemplified.

Here, as the black particles A, carbon black particles or particles in which the surfaces thereof are coated are preferably used.

In addition, although the respective shapes of the black particles A are not particularly limited, a spherical shape is preferable. Further, although the average particle diameter of each of the black particles A is not particularly limited, equal to or greater than 10 nm and equal to or less than 500 nm is preferable, and equal to or greater than 20 nm and equal to or less than 300 nm is more preferable. If the average particle diameter of the black particles A is less than 10 nm, sufficient chromaticity is not obtained, the contrast may decrease, and the display may become blurred. Conversely, if the average particle diameter of the black particles A surpasses 300 nm, there is a need to increase the coloration of the particles themselves more than is desirable, the usage amount of the pigment or the like increases, the speedy movement of the particles at portions in which a voltage is applied for displaying becomes difficult, and the response speed of such portions may decrease.

Here, the average particle diameter of the black particles A denotes a volume average particle diameter that is measured by a dynamic light scattering particle distribution measurement device (for example, product name: LB-500, manufactured by Horiba, Ltd.).

Although the three-dimensional mesh-like elastic body 6 will be described next, a problem that occurs in a case when the three-dimensional mesh-like elastic body 6 is omitted (that is, a "liquid crystal type" display device of the related art) will be described first.

If a predetermined voltage is applied between the electrodes 3 and 4, as illustrated in FIG. 2, it is possible to collect the black particles A on the second electrode 4 (substrate 12) side of the display layer 400. In so doing, black becomes displayed over the entirety of the display surface 121.

Here, a case is supposed in which the display device 20 is viewed in a state of being placed upright like a book. Therefore, as illustrated in FIG. 3, in a case when the display device 20 from which the three-dimensional mesh-like elastic body 6 is omitted is maintained upright like a book, although particles that are in contact with the second electrode 4 or particles that are positioned in the vicinity of the second electrode 4 out of the black particles A have the positions thereof maintained by the adsorbability to the second electrode 4, since there is no adsorbability to the second electrode 4 (or the adsorbability is very weak) for particles that are relatively further from the second electrode 4, such particles move (sink) to the lower side in the perpendicular direction due to their own weight.

If such a phenomenon occurs, deviation of the black particles A occurs within the display layer 400, and an image that is displayed on the display surface 121 becomes an uneven image. Further, since it is not possible to obtain a low reflection ratio by pixels in which the number of black particles A is reduced due to the movement (sinking) of the black particles A, the contrast is lowered.

In so doing, with a display device of a type of the related which does not have the three-dimensional mesh-like elastic body 6, it is not possible to exhibit excellent display characteristics.

In addition, once sinking of the black particles A occurs, it is difficult to cause the black particles A to be evenly distributed in the display layer 400, and for example, there is a need to reset the display once or the like. Therefore, as display is continued with poor display characteristics in a case when resetting is not possible, the display is temporarily cancelled in a case when the display is reset in order to restore the display characteristics, and the user-friendliness of the display device 20 deteriorates.

In addition to such problems, with a display device of the related art, since no member that has a function of suppressing a change in the thickness of the display layer 400 when the display device is bent is provided in the display layer 400, portions of the thickness of the display layer 400 change significantly when the display device is bent, and as a result, the display characteristics deteriorate. Furthermore, since bonding between the base 1 and the base 2 is performed solely by the sealing portion 9, it is not possible to increase the mechanical strength of the display device.

The three-dimensional mesh-like elastic body 6 has a function of causing the display device 20 to exhibit excellent display characteristics by solving the above problems, that is, by preventing or suppressing the movement (sinking) of the black particles A to the lower side in the vertical direction while increasing the mechanical strength of the display device 20.

The three-dimensional mesh-like elastic body 6 will be described in detail below.

As illustrated in FIG. 1, the three-dimensional mesh-like elastic body 6 is provided in the display layer 400, and while being bonded to the substrate 12 by the bonding layer 81, is bonded to the opposing substrate 11 by the bonding layer 82. The three-dimensional mesh-like elastic body 6 has a function of suppressing the movement of the black particles A in the surface direction of the display layer 400 while allowing movement in the thickness direction of the display layer 400.

In addition, the three-dimensional mesh-like elastic body 6 is a resinous elastic body that is formed to be mesh-like three-dimensionally. Specifically, the three-dimensional mesh-like elastic body 6 is able to be configured by a porous body such as foam, an aggregate such as fiber, or the like. In so doing, a three-dimensional mesh-like elastic body 6 that is excellent in the function described above with a relatively simple configuration is obtained. Here, as an aggregate of fibers, a fabric that is formed by weaving predetermined fibers, a non-fabric that is formed without weaving predetermined fibers together, and the like are exemplified.

Out of the above, using foam as the three-dimensional mesh-like elastic body 6 is preferable. In so doing, it is possible to form the three-dimensional mesh-like elastic body 6 simply and accurately.

In addition, although the porosity of the three-dimensional mesh-like elastic body 6 is not particularly limited, equal to or greater than 50% and equal to or less than 99.9% is preferable. In so doing, it is possible to secure a sufficient movement pathway for the black particles A, and the black particles A are able to move smoothly within the three-dimensional mesh-like elastic body 6.

Further, although not particularly limited, the elastic modulus of the three-dimensional mesh-like elastic body 6 is preferably equal to or greater than 0.01 MPa and equal to or less than 1000 MPa. In so doing, not only is the flexibility of the three-dimensional mesh-like elastic body 6 increased sufficiently, but the difference in the linear expansion coefficient between the substrate 12 and the opposing substrate 11 is able to be absorbed effectively.

Although not particularly limited, a resin material that configures such a three-dimensional mesh-like elastic body 6 is preferably a polymer with a molecular weight of equal to or greater than 10,000. In so doing, a three-dimensional mesh-like elastic body 6 with sufficient hardness is obtained, and the strength of the display layer 400 is able to be increased without inhibiting the flexibility of the display device 20.

In addition, a thermoplastic resin is preferable as the resin material that configures the three-dimensional mesh-like elastic body 6. In so doing, as will be described later, it becomes easy to soften the resin material by a foaming step when the three-dimensional mesh-like elastic body 6 is formed, and a three-dimensional mesh-like elastic body 6 with greater porosity is able to be formed.

Further, as a resin material that configures the three-dimensional mesh-like elastic body 6, a polymer that combines both a lipophilic group such as an alkyl group such as a methyl group or an ethyl group or a phenyl group and a hydrophilic group such as a hydroxyl group, an ester group, a urethane group, an amide group, a urea group, an ether group, an amino group, a carbonyl group, a sulfonyl group, a sulfo group, or a siloxane group is preferable. In so doing, a three-dimensional mesh-like elastic body 6 with excellent affinity with the dispersion medium 7 and in which dissolution to the dispersion medium 7 is prevented is able to be obtained.

As such a resin material, specifically, an ethylene copolymer or the like such as a urethane resin, a urea resin, an ester resin, an ether resin, a urea resin, an ethylene-vinyl acetate copolymer (EVA resin), an ethylene acrylic acid copolymer (EAA resin), an ethylene methyl methacrylate copolymer (EMMA resin), or an ethylene cyclic olefin copolymer (COC resin) is exemplified, and one or two or more types of the above are able to be used in combination.

Although the three-dimensional mesh-like elastic body 6 has been described in detail above, the three-dimensional mesh-like elastic body 6 of the embodiment is colored by a different color from the black particles A. Specifically, the three-dimensional mesh-like elastic body 6 of the embodiment is colored white. In so doing, as will be described later, a display device 20 in which black and white display is possible is obtained. Here, since a two-color display (black and white display) is possible by using only one type of particle by coloring the three-dimensional mesh-like elastic body 6 in such a manner, the configuration of the display device 20 becomes simpler.

The method of coloring the three-dimensional mesh-like elastic body 6 is not particularly limited, and for example, a method of mixing a pixel such as an organic pigment or an inorganic pigment to a resin material that configures the three-dimensional elastic body 6 is exemplified.

Such a three-dimensional mesh-like elastic body 6 is bonded to the substrate 12 via the bonding layer 81 while also being bonded to the opposing substrate 11 via the bonding layer 82. In so doing, by bonding the three-dimensional mesh-like elastic body 6 to the substrate 12 and the opposing substrate 11, since a change in the separation distance between the substrate 12 and the opposing substrate 11 when the display 20 is bent is suppressed by the elasticity that is exhibited by the three-dimensional mesh-like elastic body 6, the mechanical strength of the display device 20 is improved. Further, when there is an impact from the outside, since the impact is able to be lessened by the three-dimensional mesh-like elastic body 6 demonstrating a cushioning function, the mechanical strength of the display device 20 is also improved in such a respect. In addition, since there are no gaps formed between the substrate 12 and the three-dimensional mesh-like elastic body 6, the three-dimensional mesh-like elastic body 6 is able to be viewed from the display surface 121 however much the display device 20 is deformed, and excellent white display characteristics are able to be exhibited.

The bonding layer 81 and 82 are both film-like. It is preferable that at least the bonding layer 81 that is positioned on the display surface 121 side out of the bonding layer 81 and 82 be substantially clear and colorless.

Although not particularly limited, the film thickness of the bonding layer 81 is preferably equal to or less than 1 μm. In so doing, it is possible to bond the three-dimensional mesh-like elastic body 6 to the substrate 12 while preventing or suppressing a decline in the display characteristics.

On the other hand, although not particularly limited, the film thickness of the bonding layer 82 is preferably equal to or greater than 1 μm and equal to or less than 10 μm. Since a plurality of the first electrodes 3 is formed on the opposing substrate 11, there are concavities and convexities on an upper surface thereof. By limiting the film thickness of the bonding layer 82 to the above numerical range, it is possible to absorb the concavities and convexities on the upper surface of the opposing substrate 11 while limiting the thickness of the bonding layer 82, and it is possible to approximately flatten the upper surface of the bonding layer 82. In so doing, since the contact area between the bonding layer 82 and the three-dimensional mesh-like elastic body 6 is able to be increased further, the adhesion strength between the bonding layer 82 and the three-dimensional mesh-like elastic body 6 is able to be increased.

By setting the film thicknesses of the bonding layer 81 and 82 independently in such a manner, it is possible to obtain a display device 20 with excellent display characteristics and mechanical strength.

In addition, as will be described later, black is displayed on the display surface 121 by collecting the black particles A on the second electrode 4 side. It is therefore preferable that the bonding layer 81 that is positioned on the second electrode 4 side be insulating (that is, conductive wherein the electric charge tends to remain). In so doing, as will be described later, it becomes easy to maintain the black particles A on the second electrode 4 side even after stopping the application of a voltage between the first electrodes 3 and the second electrode 4. That is, it is possible to confer excellent memory characteristics.

On the other hand, as described above, there is a need to thicken the film thickness of the bonding layer 82 by a certain degree in order to absorb the concavities and convexities of the opposing substrate 11. Therefore, it is desirable that the bonding layer 82 be able to have a certain level of current flowing in the thickness direction thereof. In so doing, it is possible to cause an electric field to be applied effectively on the black particles A, and power-saving driving of the display device 20 is possible. Here, since the bonding layer 82 has a film thickness of a degree that can prevent the flow of current in the horizontal direction (surface direction), there is no way, for example, for a current that is supplied to a predetermined first electrode 3 to flow into the region of a different first electrode 3 via the bonding layer 82.

Here, although not particularly limited, the electrical resistance (relative resistivity) of the bonding layer 82 that exhibits the above function is preferably equal to or greater than $1 \times 10^9$ Ωcm and equal to or less than $1 \times 10^{12}$ Ωcm.

Further, it is preferable that the porosities of the bonding layer 81 and 82 be lower than the porosity of the three-dimensional mesh-like elastic body 6, respectively. In so doing, it is possible to effectively prevent the black particles A from entering the bonding layer 81 and 82 or the adhesiveness (adhesion strength) of the bonding layers 81 and 82 from decreasing.

The configuration materials of such bonding layers 81 and 82 are respectively not particularly limited, and a thermoplastic resin material such as an ethylene copolymer such as a urethane resin, a urea resin, an ester resin, an ether resin, a urea resin, an ethylene-vinyl acetate copolymer (EVA resin), an ethylene acrylic acid copolymer (EAA resin), an ethylene methyl methacrylate copolymer (EMMA resin), or an ethylene cyclic olefin copolymer (COC resin), and a thermosetting resin such as an acrylic resin, an epoxy resin, a melamine resin, or a silicone resin are exemplified, and one or two or more types of the above are able to be used in combination. Further, an adhesion aid such as a silane coupling agent or the like may be added according to need.

Among the above, it is preferable that the configuration materials of the bonding layers 81 and 82 be configured by a thermoplastic resin with a lower softening temperature than the three-dimensional mesh-like elastic body 6. In so doing, as will be described in the manufacturing method of the display device 20 described later, it is possible to bond the three-dimensional mesh-like elastic body 6 to the bonding layers 81 and 82 while preventing the softening of the three-dimensional mesh-like elastic body 6 and preventing the disappearance of vacancies within the three-dimensional mesh-like elastic body 6. It is therefore possible to manufacture a display device 20 with predetermined characteristics easily.

Here, in a case when adjusting the electrical resistance of the bonding layer 82 to the above numerical range, the electrical resistance of the bonding layer 82 may be adjusted by adding, for example, a functional group such as carboxyl acid ammonium salts, carboxyl acid sodium salts, or sulfonic acid sodium salts to an end of a resin (polymer) that is the configuration material of the bonding layer 82. Further, a conductive filler such as carbon black may be dispersed in the bonding layer 82.

The display layer 400 has been described above. Although not particularly limited, it is preferable that the thickness of such a display layer 400 be equal to or greater than 5 μm and equal to or less than 50 μm. In so doing, it is possible to conceal the black particles A by the three-dimensional mesh-like elastic body 6 while limiting the thickness of the display layer 400 during a white display state described later. That is, it is possible to cause the black particles A to be substantially invisible from the display surface 121, and white with a high reflection ratio is able to be displayed.

Driving Method of Display Device

Such a display device 20 is driven as follows.

If a voltage is applied between the electrodes 3 and 4, an electric field is created therebetween. The black particles A move (electrically migrate) towards either the electrodes 3 or 4 in accordance with the electric field. A case in which black particles A with a negative charge are used will be representatively described below. Further, below, one pixel will be representatively described for convenience of description.

White Display State

If a voltage is applied between the first electrodes 3 and the second electrode 4 such that the first electrodes 3 have a positive electric potential and the second electrode 4 has a negative electric potential, the electric field that is created by applying the voltage acts on the black particles A in the display layer 400. Then, as illustrated in FIG. 4A, the black particles A migrate to the first electrodes 3 side and collect at the first electrodes 3. If such a state is seen from the display surface 121, the black particles A are concealed by the three-dimensional mesh-like elastic body 6, and only the three-dimensional mesh-like elastic body 6 that is colored white is seen. A white display state in which white is displayed on the display surface 121 is thereby created.

Furthermore, in a case when the display device 20 is placed upright in such a state, the black particles A are prone to move (sink) to the lower side in the perpendicular direction due to their own weight. However, since the black particles A are constrained by the three-dimensional mesh-like elastic body 6 as illustrated in FIG. 4B, such a movement is prevented or suppressed. According to such a display device 20, since the involuntary movement of the black particles A is prevented or suppressed and bias of the particles within the display layer 400 is able to be effectively prevented or suppressed, an even and clear image is able to be displayed on the display surface 121. The same is also true of the black display state described below.

Black Display State

If a voltage is applied between the first electrodes 3 and the second electrode 4 such that the first electrodes 3 have a negative electric potential and the second electrode 4 has a positive electric potential, the electric field that is created by applying the voltage acts on the black particles A in the display layer 400. Then, as illustrated in FIG. 5A, the black particles A migrate to the second electrode 4 side and collect at the second electrode 4. In so doing, a black display state in which black that is the color of the black particles A is displayed on the display surface 121 is created. Here, in such a state, since a majority of the three-dimensional mesh-like elastic body 6 is covered by the black particles A that are collected at the second electrode 4, the three-dimensional mesh-like elastic body 6 has substantially no influence over the black display state.

Furthermore, in a case when the display device 20 is placed upright in such a state, the black particles A are prone to move (sink) to the lower side in the perpendicular direction due to their own weight. However, since the black particles A are constrained by the three-dimensional mesh-like elastic body 6 as illustrated in FIG. 5B, such a movement is prevented or suppressed.

The display device 20 is able to display a predetermined image on the display surface 121 by selecting a white display state or a black display state for every pixel, that is, by combining pixels of a white display state and pixels of a black display state. With such a display device 20, since approximately the entirety of the display surface 121 is able to be an effective image display region (region in which the display color is able to be switched), a clearer image is able to be displayed on the display surface 121.

Manufacturing Method is Display Device

Next, a manufacturing method of the display device 20 will be described based on FIGS. 6A to 6D and 7A to 7D.

Figure 6A:
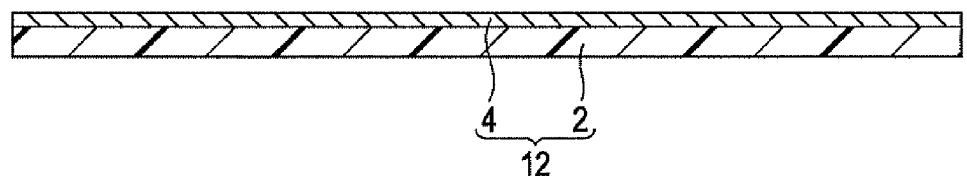
FIGS. 6A to 6D are cross-sectional diagrams for describing a manufacturing method of the display device that is illustrated in FIG. 1.

First, as illustrated in FIG. 6A, the substrate 12 is prepared. The substrate 12 is obtained, for example, by forming the second electrode 4 that is configured by an ITO thin film on one surface of the base 2 that is configured by PET.

Figure 6B:
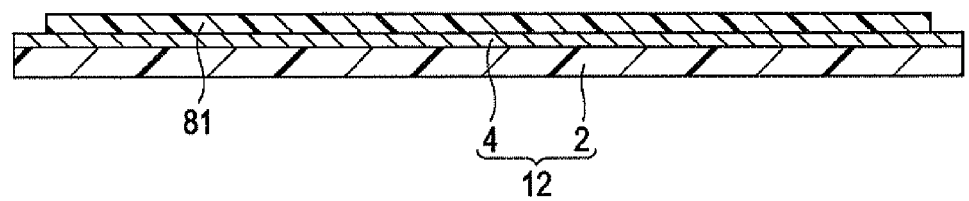

Next, as illustrated in FIG. 6B, the bonding layer 81 is formed by applying an adhesive on the surface of the second electrode 4. Here, as described above, a thermoplastic resin with a lower softening temperature than the configuration material of the three-dimensional mesh-like elastic body 6 is able to be used as the adhesive. Further, as an application method of the adhesive, various types of application methods such as, for example, dye coating, comma coating, gravure coating, lip coating, and screen printing are able to be used.

Figure 6C:
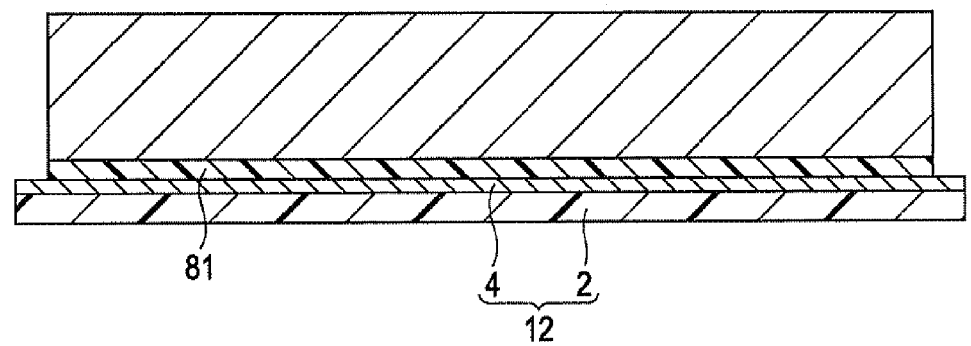

Next, for example, an aqueous emulsion dispersion liquid in which a urethane resin (thermoplastic resin) with an average particle diameter of 0.1 μm to 1 μm is dispersed in an aqueous dispersion medium is prepared, and as illustrated in FIG. 6C, the aqueous emulsion dispersion liquid is applied on the surface of the bonding layer 81. As an application method of the aqueous emulsion dispersion liquid, various types of application methods such as, for example, dye coating, comma coating, gravure coating, lip coating, and screen printing are able to be used.

Figure 6D:
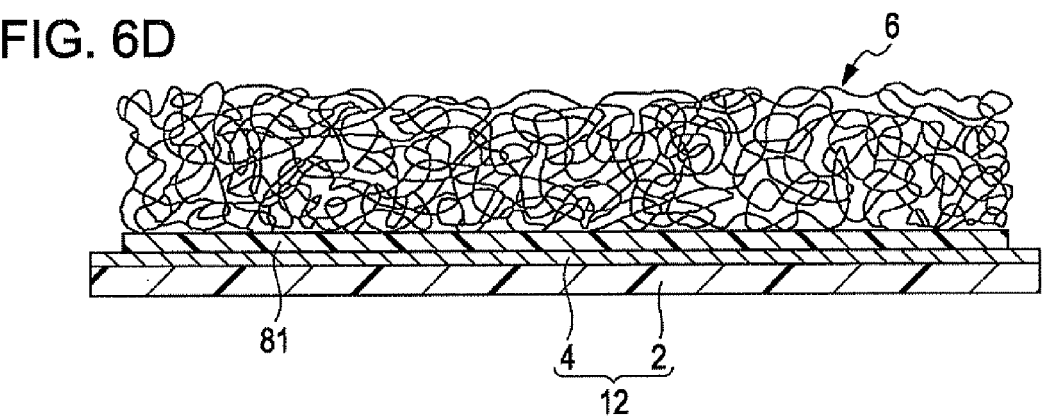

Next, by causing the layer of the aqueous emulsion dispersion liquid that is formed on the surface of the bonding layer 81 to be at a high temperature and high pressure by heat laminating by a roll laminator or the like and performing foaming by vaporizing the moisture (dispersion medium) while softening the resin material in the aqueous emulsion dispersion liquid, as illustrated in FIG. 6D, a three-dimensional mesh-like elastic body 6 in which many vacancies that overlap one another are formed is obtained.

Figure 7A:
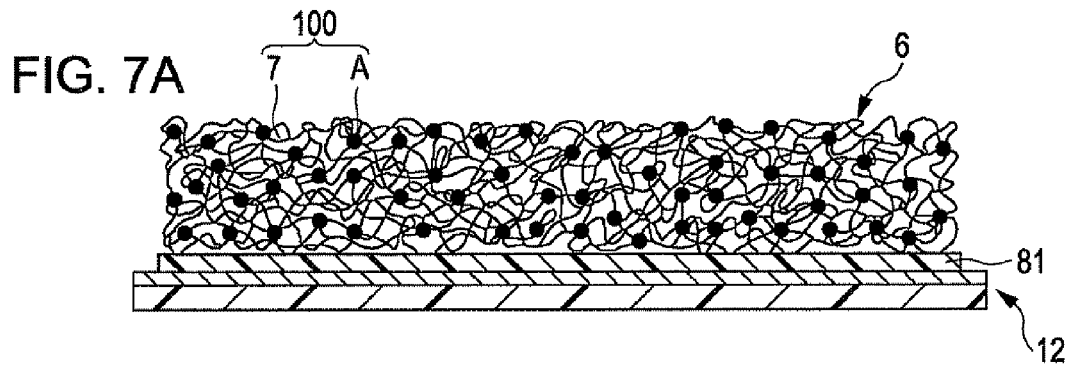
FIGS. 7A to 7D are another cross-sectional diagrams for describing the manufacturing method of the display device that is illustrated in FIG. 1.

Next, in a state in which the three-dimensional mesh-like elastic body 6 is squashed in the thickness direction thereof, the three-dimensional mesh-like elastic body 6 is immersed in a tank in which the dispersion liquid 100 is stored, after which the three-dimensional mesh-like elastic body 6 is returned to a natural state. When returning to the natural state, the three-dimensional mesh-like elastic body 6 absorbs the dispersion liquid 100 into the vacancies. In so doing, as illustrated in FIG. 7A, a three-dimensional mesh-like elastic body 6 to which the dispersion liquid 100 is impregnated is obtained.

Figure 7B:
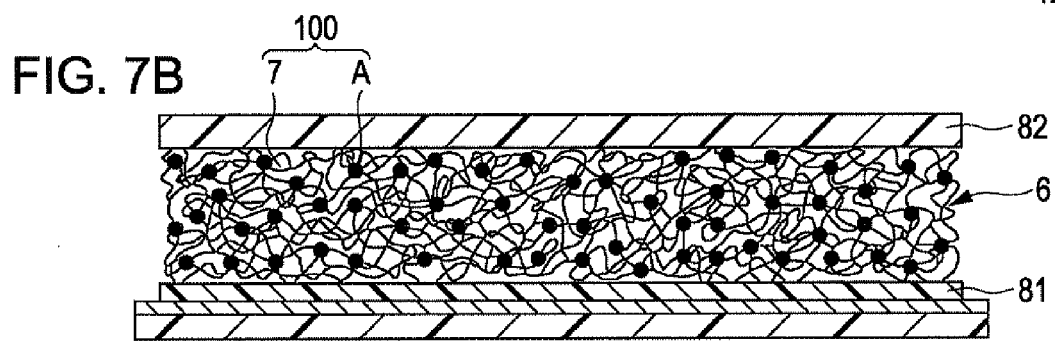

Next, as illustrated in FIG. 7B, the bonding layer 82 is formed by applying an adhesive on the surface of the three-dimensional mesh-like elastic body 6. Here, as described above, a thermoplastic resin with a lower softening temperature than the configuration material of the three-dimensional mesh-like elastic body 6 is able to be used as the adhesive. Further, as an application method of the adhesive, various types of application methods such as, for example, dye coating, comma coating, gravure coating, lip coating, and screen printing are able to be used.

Figure 7C:
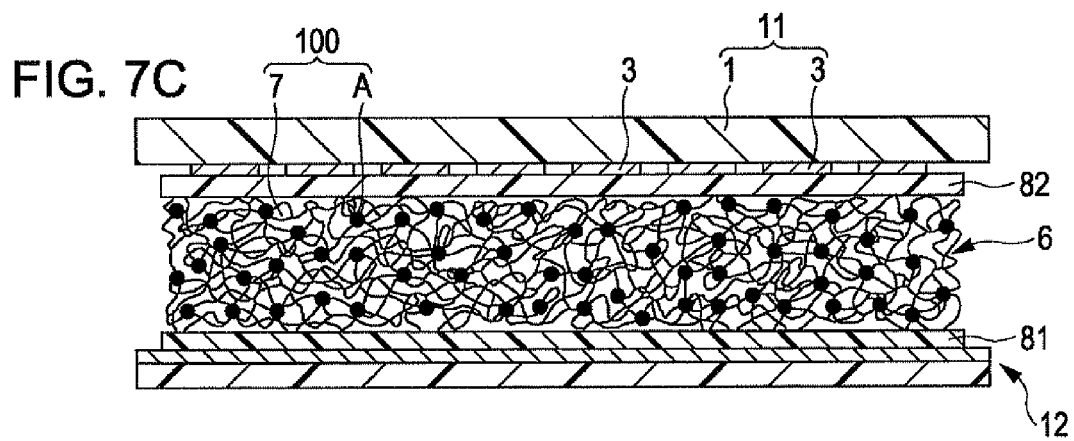

Next, as illustrated in FIG. 7C, the opposing substrate 11 is arranged over the bonding layer 82, and the opposing substrate 11 and the three-dimensional mesh-like elastic body 6 are bonded via the bonding layer 82 while bonding the substrate 12 to the three-dimensional mesh-like elastic body 6 via the bonding layer 81. The heating temperature of the roll laminator is set to be higher than the softening temperatures of the bonding layers 81 and 82, and lower than the softening temperature of the three-dimensional mesh-like elastic body 6. In so doing, bonding as described above is able to be performed while preventing softening within the three-dimensional mesh-like elastic body 6 (that is, the disappearance of vacant spaces within the three-dimensional mesh-like elastic body 6).

Figure 7D:
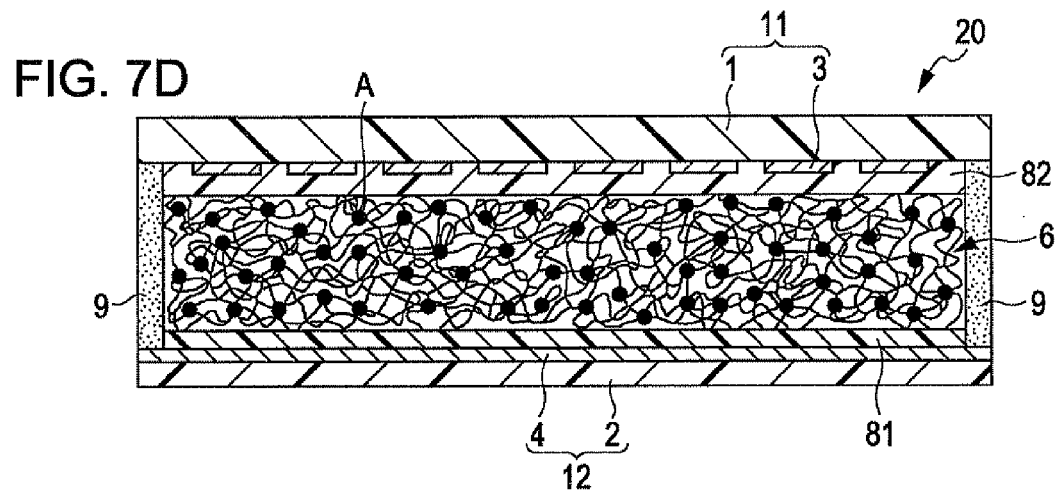

Next, as illustrated in FIG. 7D, the display device 20 is obtained by forming a sealing portion composed of an epoxy adhesive between the substrate 12 and the opposing substrate 11.

By such a manufacturing method, it is possible to manufacture the display device 20 relatively easily and cheaply.

Here, the formation method of the three-dimensional mesh-like elastic body 6 is not limited to the method described above, and may be, for example, a method as below. That is, the three-dimensional mesh-like elastic body 6 may be formed by first applying an application liquid in which an emulsion such as polyol ester, polyether polyol, or polyurethane polyol is added so that a water-dispersible isocyanate-based polymer has thermoplasticity on the surface of the bonding layer 81, thereafter exposing to a high temperature and high pressure, and performing foaming through carbon dioxide that is produced by three-dimensional urea crosslinking. Further, a three-dimensional mesh-like elastic body 6 in a sheet form that is prepared in advance may be pasted on the surface of the bonding layer 81.

Second Embodiment

FIG. 8 is a cross-sectional diagram that illustrates a Second Embodiment of the display device according to an aspect of the invention, and FIGS. 9A and 9B are cross-sectional diagrams for describing the driving of the display device that is illustrated in FIG. 8.

Below, the Second Embodiment will be described centered on the differences with the embodiment described above, and description of items that are the same will be omitted.

A display device according to the Second Embodiment is the same as the display device of the First Embodiment except that the configuration of the dispersion liquid is different. Here, the same reference numerals are given to configurations that are the same as in the First Embodiment.

As illustrated in FIG. 8, in the display device 20 of the embodiment, the black particles A and white particles B are included in the dispersion liquid 100. Further, the black particles A and the white particles B are charged with the opposite polarities to each other.

With such a display device 20, as illustrated in FIG. 9A, a black display state is created by collecting the black particles A to the second electrode 4 side while collecting the white particles B to the first electrodes 3 side, and as illustrated in FIG. 9B, a white display state is created by collecting the white particles B to the second electrode 4 side while collecting the black particles A to the first electrodes 3 side.

Third Embodiment

Figure 10:
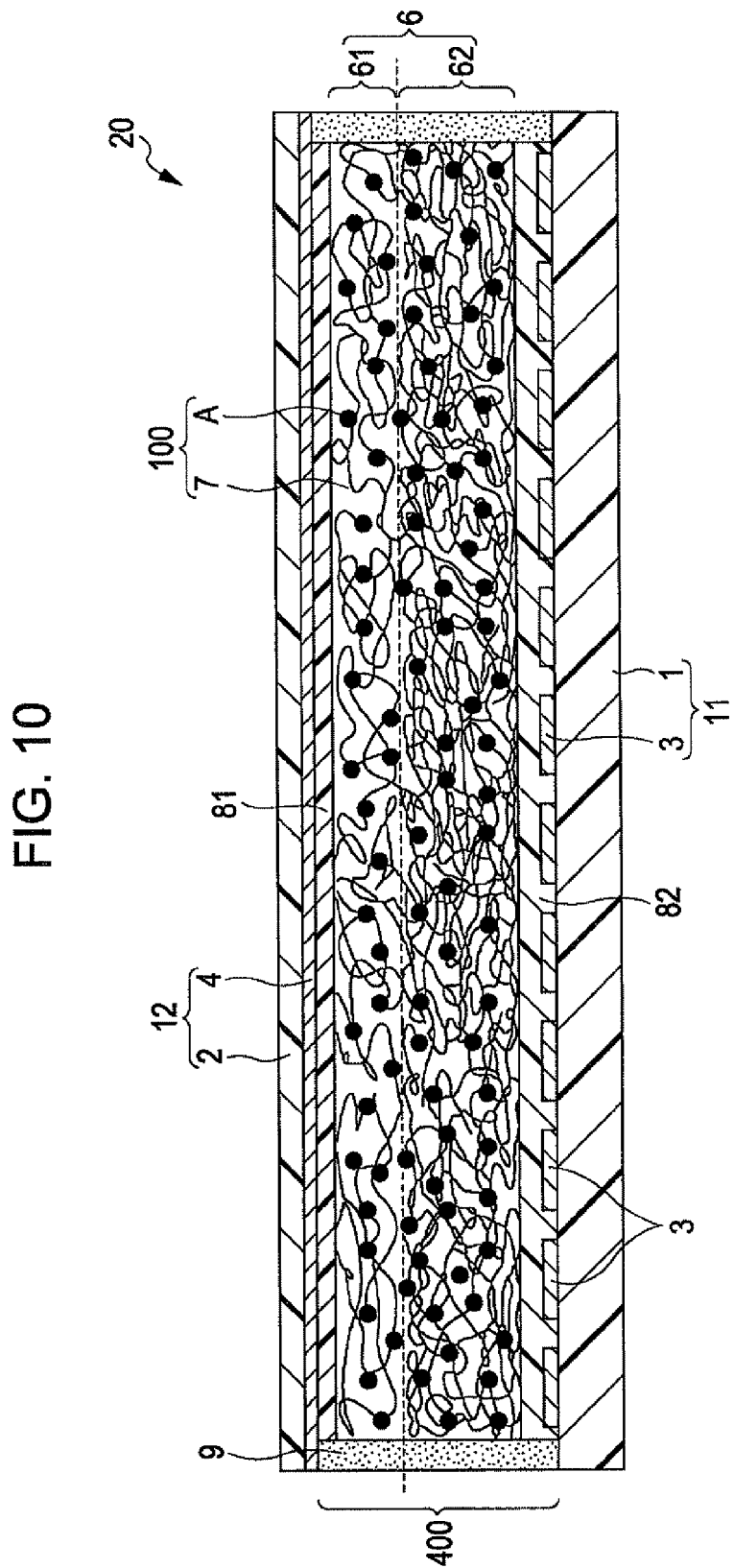
FIG. 10 is a cross-sectional diagram that illustrates a Third Embodiment of a display device according to an aspect of the invention.

FIG. 10 is a cross-sectional diagram that illustrates a Third Embodiment of a display device according to an aspect of the invention.

Below, the Third Embodiment will be described centered on the differences with the embodiments described above, and description of items that are the same will be omitted.

A display device according to the Third Embodiment is the same as the display device of the First Embodiment except that the configuration of the three-dimensional mesh-like body is different. Here, the same reference numerals are given to configurations that are the same as in the First Embodiment.

As illustrated in FIG. 10, in the display device 20 of the embodiment, the three-dimensional mesh-like elastic body 6 includes a first layer 61 that is positioned on the substrate 12 side and a second layer 62 that is positioned further on the opposing substrate 11 side than the first layer 61. Further, the first layer 61 has a greater porosity than the second layer 62.

Although not particularly limited, the porosity of the first layer 61 is preferably equal to or greater than 70% and equal to or less than 99.9%. Since it is thereby possible to collect more black particles A on the second electrode 4 side, it is possible to display black with a low reflection ratio during a black display state. On the other hand, although not particularly limited as long as the porosity of the second layer 62 is lower than the porosity of the first layer 61, the porosity of the second layer 62 is, for example, preferably equal to or greater than 50% and equal to or less than 70%. In so doing, since the black particles A are able to be blocked reliably by the second layer 62 in a white display state, white with a greater reflection ratio is able to be displayed.

Further, although not particularly limited, the thickness of the first layer 61 is preferably approximately equal to or greater than 1/10 and equal to or less than 1/2 of the thickness of the second layer 62. In so doing, the effects described above become more pronounced.

With such a three-dimensional mesh-like elastic body 6, the first layer 61 and the second layer 62 may be formed in separate steps or may be formed at the same time in the same step. In a case when the first layer 61 and the second layer 62 are formed in separate steps, the three-dimensional mesh-like elastic body 6 is able to be formed by first obtaining the first layer 61 by applying a resin material that becomes the first layer 61 on the surface of the second electrode 4 and causing the resin material to foam, after which the second layer 62 is obtained by applying a resin material that becomes the second layer 62 on the surface of the first layer 61 and causing the resin material to foam. In a case when the first layer 61 and the second layer 62 are formed in the same step, the first layer 61 and the second layer 62 with different porosities are able to be formed at the same time by, for example, after applying a resin material that becomes the three-dimensional mesh-like elastic body 6 on the surface of the second electrode 4, when the resin material is caused to foam, differentiating the heating temperature of one side from the other side in the thickness direction and causing foaming conditions to be different.

Fourth Embodiment

Figure 11:
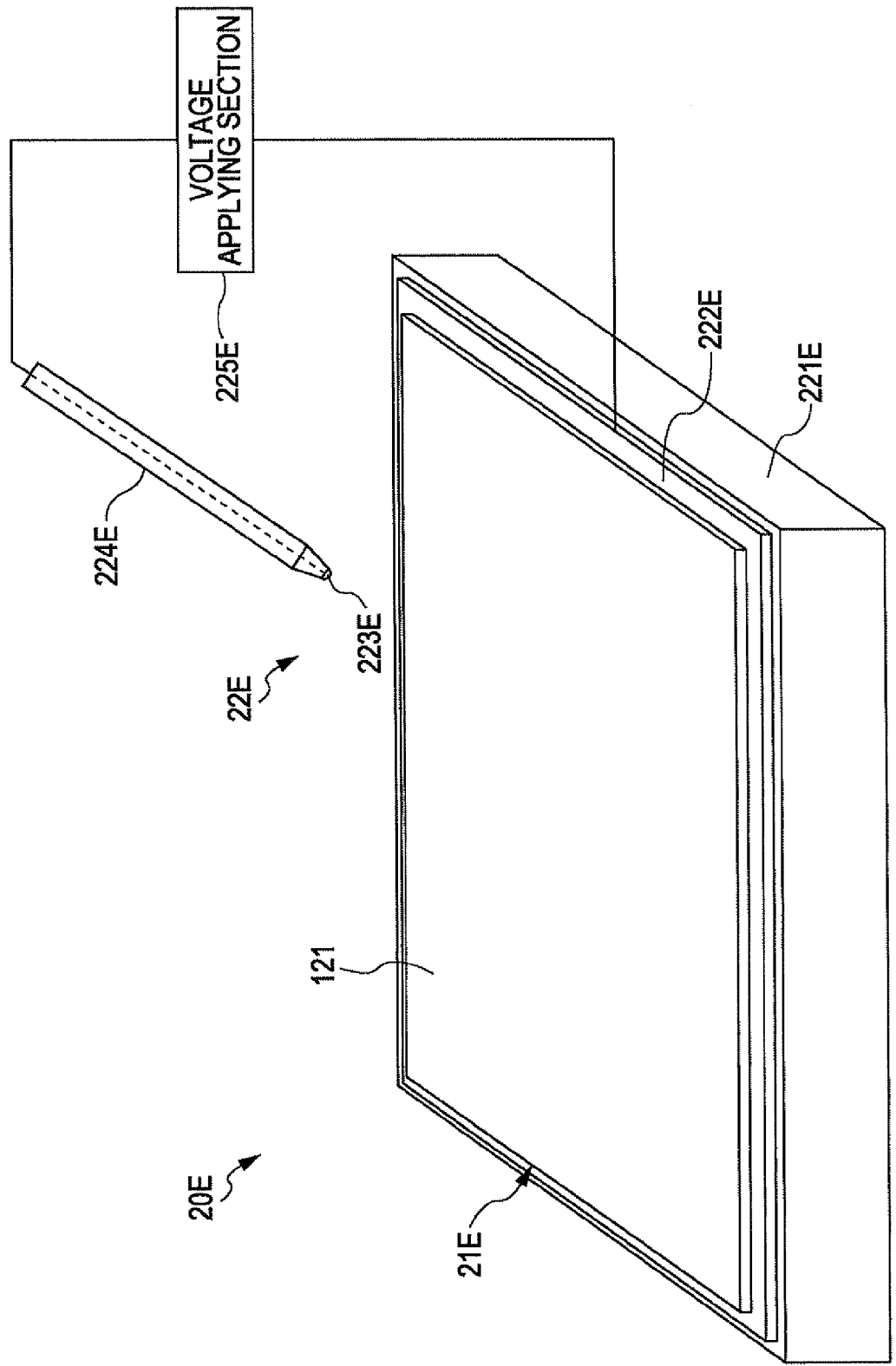
FIG. 11 is an outline cross-sectional diagram that illustrates a Fourth Embodiment of a display device according to an aspect of the invention.
Figure 12:
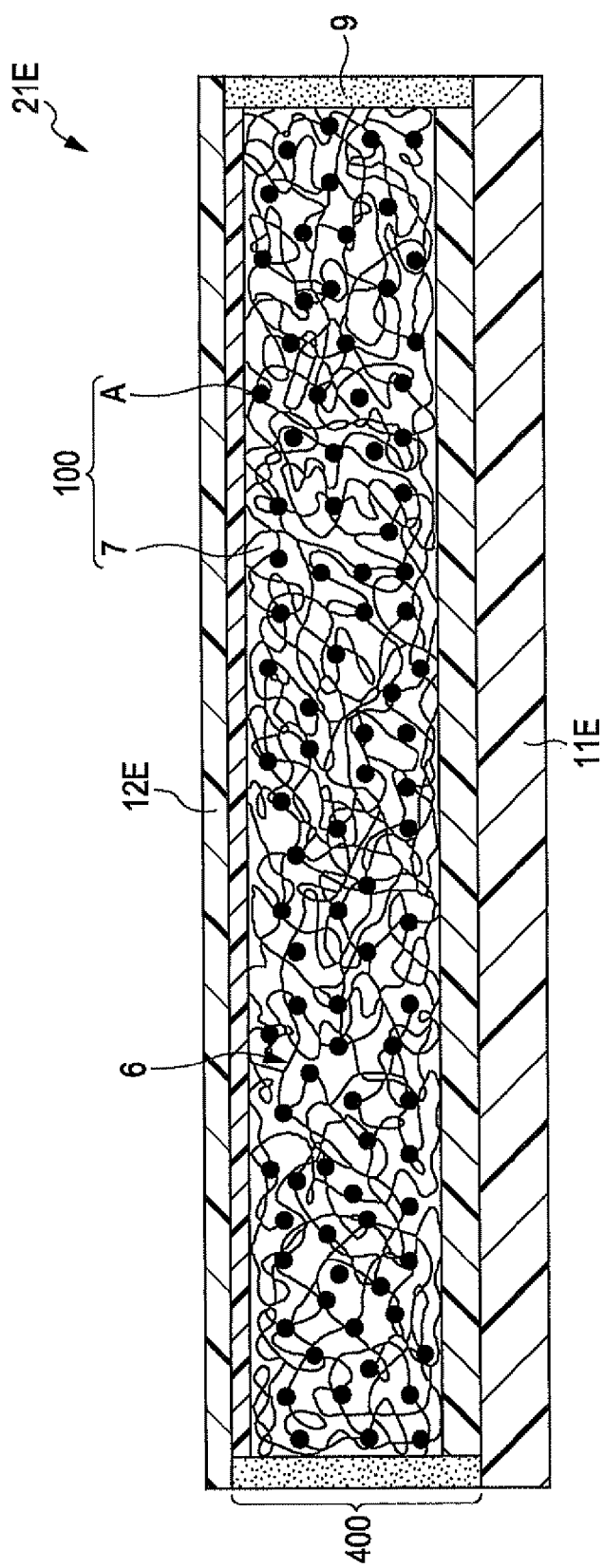
FIG. 12 is a cross sectional diagram of the display sheet that is illustrated in FIG. 11.

FIG. 11 is an outline cross-sectional diagram that illustrates a Fourth Embodiment of a display device according to an aspect of the invention, and FIG. 12 is a cross sectional diagram of the display sheet that is illustrated in FIG. 11.

Below, the Fourth Embodiment will be described centered on the differences with the embodiments described above, and description of items that are the same will be omitted.

A display device according to the Fourth Embodiment according to an aspect of the invention is the same as the First Embodiment except that a display sheet is configured separately.

As illustrated in FIG. 11, a display device 20E of the embodiment includes a display sheet 21E and a writing device 22E.

The display sheet 21E includes, as illustrated in FIG. 12, a substrate (first substrate) 12E, a substrate (second substrate) 11E that is arranged opposing the substrate 12E, the display layer 400 arranged between the substrate 12E and 11E, the three-dimensional mesh-like elastic body 6 that is arranged in the display layer 400, and a sealing portion 9 that seals the display layer 400. Since the substrates 12E and 11E respectively have the same configuration as the base 2 of the substrate 12 of the First Embodiment described above, description thereof will be omitted.

The writing device 22E is a device that is used when writing a desired image (patterns, colors, characters, pictures, a combination thereof, or the like) on the display sheet 21E. As illustrated in FIG. 11, the writing device 22E includes a mount 221E, a sheet-form shared electrode 222E that is provided over the mount 221E, a writing pen (input tool) 224E with a partial electrode 223E provided on the end, and a voltage applying section 225E that applies a voltage between the shared electrode 222E and the partial electrode 223E.

Such a display device 20E is used, for example, as below.

First, the display sheet 21E of which the entirety of the display surface 121 is in a white display state is placed over the shared electrode 222E of the writing device 22E with the display surface 121 on the upper side. Next, a voltage by which the partial electrode 223E side becomes a low charge is applied between the shared electrode 222E and the partial electrode 223E by the voltage applying section 225E. By causing the writing pen 224E to be moved on a desired trajectory while in contact with the display surface 121, migration of particles in regions that correspond to the trajectory takes place, and the display color changes from white to black.

According to such a display device 20E, a desired character or the like is able to be written on the display surface 121 of the display sheet 21E with the same feel as writing a character or the like with a pencil on paper. The operability (operation feel) of the display device 20E is therefore improved.

The display devices 20 described above are all able to be built into various types of electronic apparatuses. As an electronic apparatus according to an aspect of the invention which includes an electrophoretic display device, for example, electronic paper, electronic books, televisions, viewfinder type and monitor direct view type video tape recorders, car navigation devices, pagers, electronic organizers, calculators, electronic newspapers, word processors, personal computers, work stations, television phones, POS terminals, apparatuses including a touch panel, and the like are able to be exemplified.

Out of such electronic apparatuses, electronic paper will be exemplified and described specifically.

Figure 13:
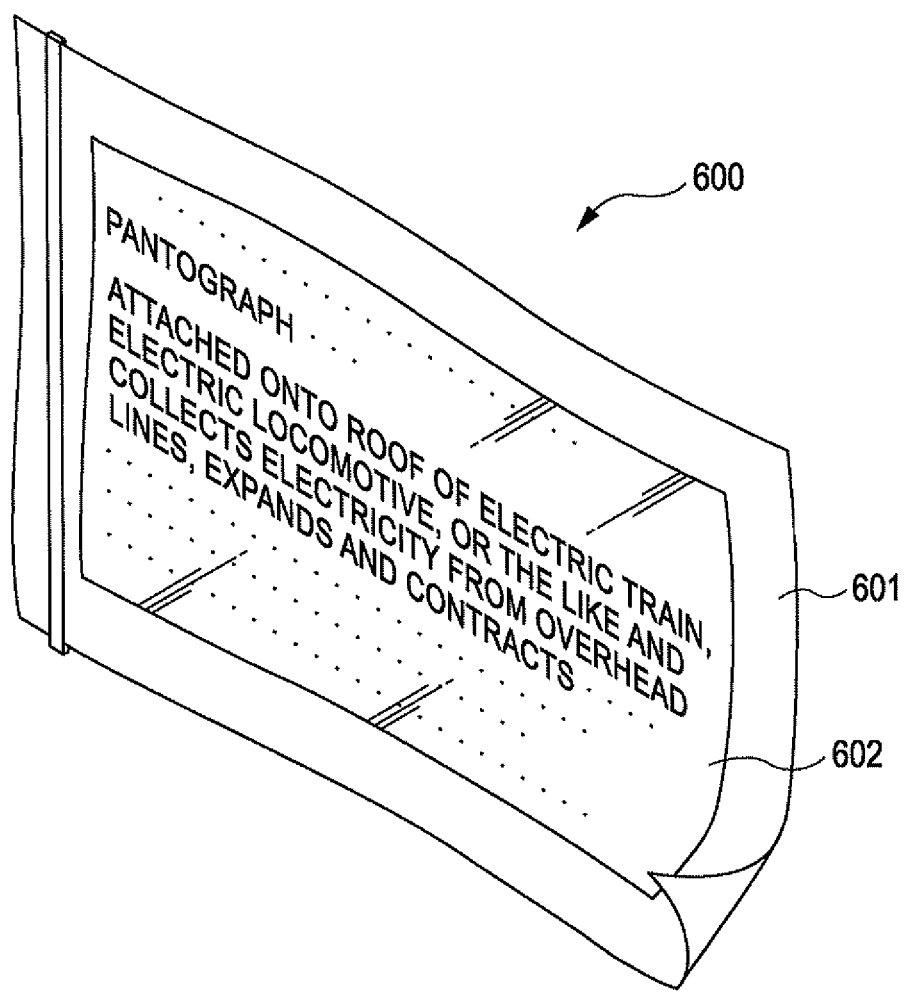
FIG. 13 is a perspective diagram that illustrates an embodiment in a case when an electronic apparatus according to an aspect of the invention is applied to electronic paper.

FIG. 13 is a perspective diagram that illustrates an embodiment in a case when an electronic apparatus according to an aspect of the invention is applied to electronic paper.

Electronic paper 600 that is illustrated in FIG. 13 includes a main body 601 that is configured by a rewritable sheet with the same feel and pliability as paper and a display unit 602. In such electronic paper 600, the display unit 602 is configured by the type of display device 20 described above.

Next, an embodiment in a case when an electronic apparatus according to an aspect of the invention is applied to a display will be described.

Figure 14A:
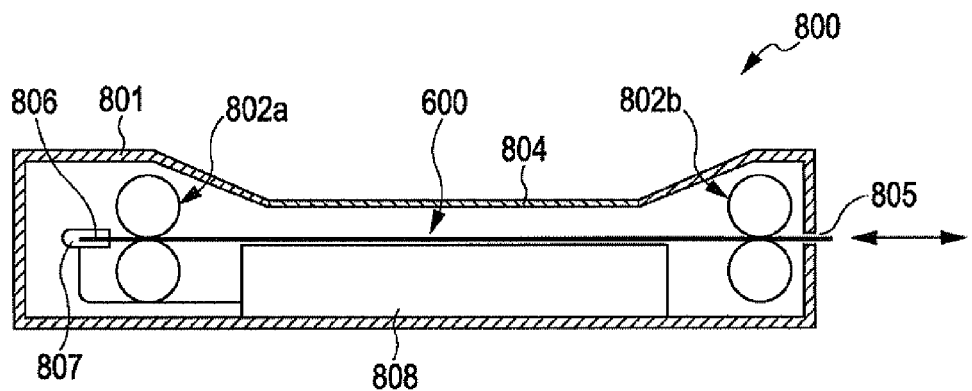
FIGS. 14A and 14B are diagrams that illustrate an embodiment in a case when an electronic apparatus according to an aspect of the invention is applied to a display.
Figure 14B:
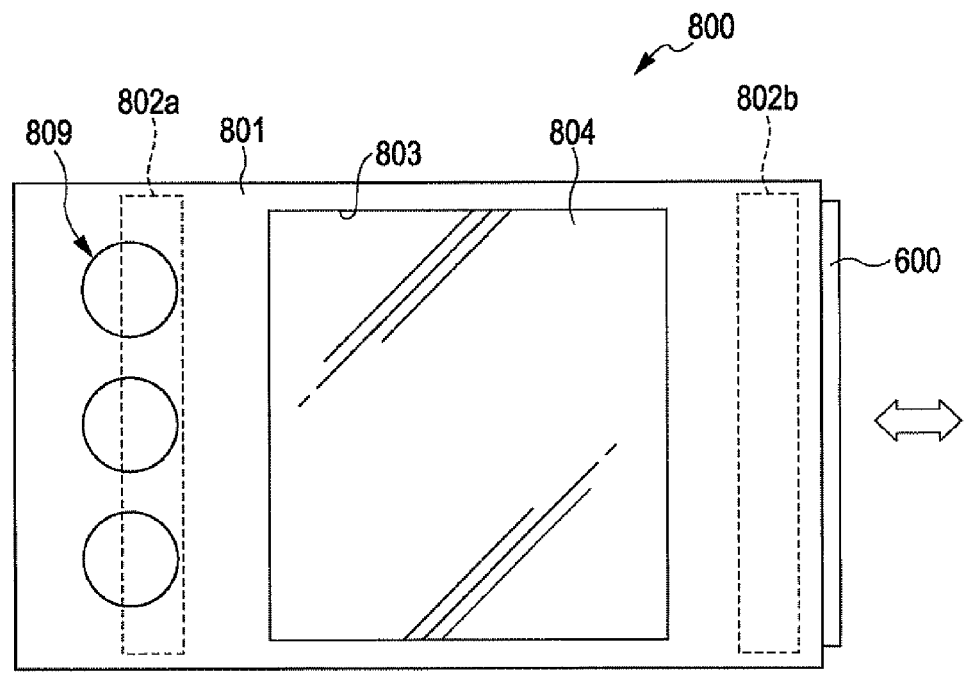

FIGS. 14A and 14B are diagrams that illustrate an embodiment in a case when an electronic apparatus according to an aspect of the invention is applied to a display. Out of the drawings, FIG. 14A is a cross-sectional diagram and FIG. 14B is a plan diagram.

A display (display device) 800 that is illustrated in FIGS. 14A and 14B includes a main body portion 801 and the electronic paper 600 that is provided to be detachable from the main body portion 801. Here, the electronic paper 600 has the same configuration as described above, that is, the same as the configuration illustrated in FIG. 13.

The main portion 801 has an insertion opening 805 through which the electronic paper is able to be inserted on a side portion thereof (right side in FIG. 14B), and two sets of transport roller pairs 802a and 802b are provided on the inside. When the electronic paper 600 is inserted into the main body 801 via the insertion opening 805, the electronic paper 600 is installed in the main body portion 801 in a state of being interposed by the transport roller pairs 802a and 802b.

A rectangular hole portion 803 is formed on the display surface side of the main portion 801 (near side of the paper surface in FIG. 14B), and a transparent glass plate 804 is inserted in the hole portion 803. It is thereby possible to view the electronic paper 600 in a state of being installed in the main body portion 801 from the outside of the main body portion 801. That is, with the display 800, the display surface is configured by causing the electronic paper 600 that is installed in the main body portion 801 to be viewed through the transparent glass plate 804.

Furthermore, a terminal portion 806 is provided on the insertion direction end portion of the electronic paper 600 (left side in FIG. 14B), and on the inside of the main body portion 801, a socket 807 to which the terminal portion 806 is connected in a state in which the electronic paper 600 is installed in the main portion 801 is provided. A controller 808 and an operation portion 809 are electrically connected to the socket 807.

In such a display 800, the electronic paper 600 is detachably installed in the main body portion 801, and may be used portably in a state of being detached from the main body portion 801. In so doing, user-friendliness is improved.

Although a display sheet, a display device, and an electronic apparatus according to some aspects of the invention have been described above based on the embodiments shown in the drawings, aspects of the invention are not limited thereto, and the configurations of each of the portions are able to be substituted by arbitrary configurations that have the same functions. Further, other arbitrary configurations may be added to the aspects of the invention. Furthermore, each of the embodiments may be appropriately combined.

In addition, although a case in which the particles that are contained in the dispersion liquid is black or a case in which white and black are mixed has been described in the embodiments above, the colors of the particles are not limited thereto, and for example, may be chromatic colors such as blue, red, green, or the like.

The entire disclosure of Japanese Patent Application No. 2010-242241, filed Oct. 28, 2010 is expressly incorporated by reference herein.

What is claimed is:

1. A display sheet comprising:
    a first substrate;
    a second substrate that is arranged opposing the first substrate;
    a display layer that is provided between the first substrate and the second substrate, the display layer including:
        a three-dimensional elastic body that is impregnated by a dispersion liquid in which at least one type of particle that is positively or negatively charged is dispersed in a dispersion medium; and
        a first substrate side bonding layer that is provided between the three-dimensional mesh-like elastic body and the first substrate and which bonds the three-dimensional mesh-like elastic body to the first substrate;
    an electrode provided between the first substrate and the display layer; and
    a plurality of pixel electrodes provided between the second substrate and the display layer, the pixel electrodes being arranged in a matrix of individually addressable pixels, and
    wherein both the first substrate side bonding layer and the second substrate side bonding layer are configured by a thermoplastic resin with a lower softening temperature than the three-dimensional mesh-like elastic body.

2. The display sheet according to claim 1,
    wherein the display layer further includes a second substrate side bonding layer that is provided between the three-dimensional mesh-like elastic body and the second substrate and which bonds the three-dimensional mesh-like elastic body to the second substrate.

3. The display sheet according to claim 1,
    wherein both the first substrate and the second substrate are flexible.

4. The display sheet according to claim 1,
    wherein the three-dimensional mesh-like elastic body is configured by an amphiphilic polymer including both a lipophilic group and a hydrophilic group.

5. The display sheet according to claim 1,
    wherein the three-dimensional mesh-like elastic body is configured by a thermoplastic polymer.

6. The display sheet according to claim 1,
    wherein in the three-dimensional mesh-like elastic body, the first substrate side has a greater porosity than the second substrate side.

7. The display sheet according to claim 1,
    wherein the three-dimensional mesh-like elastic body exhibits a different color from that of the particle.

8. The display sheet according to claim 1,
    wherein both the first substrate side bonding layer and the second substrate side bonding layer have a lower porosity than the three-dimensional mesh-like elastic body.

9. A display device including the display sheet according to claim 1.

10. An electronic apparatus including the display device according to claim 9.

* * * * *